US006648297B1

(12) United States Patent
Butzmann et al.

(10) Patent No.: US 6,648,297 B1
(45) Date of Patent: Nov. 18, 2003

(54) METHOD FOR CONTROLLING AN ELECTROMECHANICAL ACTUATOR

(75) Inventors: Stefan Butzmann, Hagen (DE); Joachim Melbert, Deisenhofen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 10/009,672

(22) PCT Filed: May 23, 2000

(86) PCT No.: PCT/DE00/01649

§ 371 (c)(1), (2), (4) Date: May 5, 2003

(87) PCT Pub. No.: WO00/79548

PCT Pub. Date: Dec. 28, 2000

(30) Foreign Application Priority Data

Jun. 18, 1999 (DE) ........................................ 199 27 982

(51) Int. Cl.[7] ................................................ F16K 31/02
(52) U.S. Cl. .................. 251/129.15; 335/256; 361/160
(58) Field of Search ................................ 335/251, 255, 335/256, 277–282, 220–229; 123/90.11; 251/129.01–129.18; 361/139, 160, 166, 167

(56) References Cited

U.S. PATENT DOCUMENTS 5,125,370 A * 6/1992 Kawamura ............... 123/90.11
5,481,187 A * 1/1996 Marcott et al. ........ 324/207.16
6,363,895 B1 * 4/2002 Butzmann et al. ....... 123/90.11

FOREIGN PATENT DOCUMENTS

| | | |
|---|---|---|
| DE | 19526683 | 7/1995 |
| DE | 19640659 | 10/1996 |
| DE | 19723931 | 6/1997 |
| DE | 19735375 | 8/1997 |
| DE | 19745536 | 10/1997 |
| DE | 19805455 | 11/1998 |
| EP | 0727566 | 8/1996 |

* cited by examiner

*Primary Examiner*—Tuyen T. Nguyen
(74) *Attorney, Agent, or Firm*—Baker Botts LLP

(57) ABSTRACT

In order to control an actuator, the following steps are executed in the order indicated when an armature plate is to be moved from contact with a contact surface to contact with a contact surface on an electromagnet. A predefined amount of electrical energy is supplied to the coil. The coil is controlled into a freewheeling operating state until a first condition is satisfied. A predefined second amount of electrical energy is supplied to the coil before the armature plate is resting on the contact surface of the electromagnet. The coil controlled into a freewheeling operating state until a second condition is satisfied, whose satisfaction is an indication that the armature plate (116) is resting on the contact surface of the electromagnet.

9 Claims, 4 Drawing Sheets

METHOD FOR CONTROLLING AN ELECTROMECHANICAL ACTUATOR

This application is a 371 of PCT/DE00/01649 filed May 23, 2000.

FIELD OF THE INVENTION

The invention relates to a method for controlling an electromechanical actuator, in particular for a gas exchange valve in an internal combustion engine.

BACKGROUND OF THE INVENTION

The reference DE 195 26 683 A1 describes an actuator having an assigned actuating element which is designed as a gas exchange valve. The actuator has two electromagnets, between which an armature plate can be moved counter to the force of a restoring means by switching off the coil current on the holding electromagnet and switching on the coil current on the capturing electromagnet. The coil current of the respective capturing electromagnet is regulated to a predefined capture value, specifically during a predefined time period which is dimensioned such that the armature plate strikes a contact surface on the capturing electromagnet within the time period. The coil current of the capturing electromagnet is then regulated to a holding value.

SUMMARY OF THE INVENTION

Strict statutory regulations limit the values relating to noise emission from a motor vehicle. Accordingly, internal combustion engines must run quietly and this necessarily assumes that for an actuator to be suitable for mass production, its noise production must also be low. It is therefore the object of the present invention to provide a method for controlling an electromechanical actuator which minimizes the production of noise when an armature plate strikes an electromagnet and, at the same time, ensures reliable operation of the actuator.

The present invention is based on the discovery that in order to move the armature plate from the first or the second contact surface toward the second or first contact surface so that the speed at which the armature plate strikes the second contact surface is close to zero, exactly that quantity of energy must be supplied to the spring/mass oscillator which is removed from the latter by the electrical and mechanical losses of the spring/mass oscillator. The coil of the electromagnet can be supplied very precisely with energy when the armature plate is still outside the near region of the contact surface on the electromagnet. The invention is distinguished by the fact that a necessary first amount of electrical energy is supplied when the armature plate is still outside the near region of the contact surface on the electromagnet. A second predefined amount of electrical energy is supplied to the coil following a freewheeling operating state and before the armature plate is resting on the contact surface on the electromagnet. The coil is then controlled into the freewheeling operating state again until the armature plate comes into contact with the contact surface on the electromagnet. By means of supplying the second amount of electrical energy, which is preferably supplied when the armature plate is in the near region of the contact surface on the electromagnet, the accuracy of registering the exact point at which the armature plate strikes the contact surface on the electromagnet can be increased. The sum of the first and second amount of the electrical energy is preferably determined in such a way that it corresponds exactly to the amount of energy removed from the spring/mass oscillator by electrical and mechanical losses.

BRIEF DESCRIPTION OF THE DRAWINGS

The present invention is explained in greater detail below in connection with the drawings, in which.

DETAILED DESCRIPTION OF THE INVENTION

Figure 1:
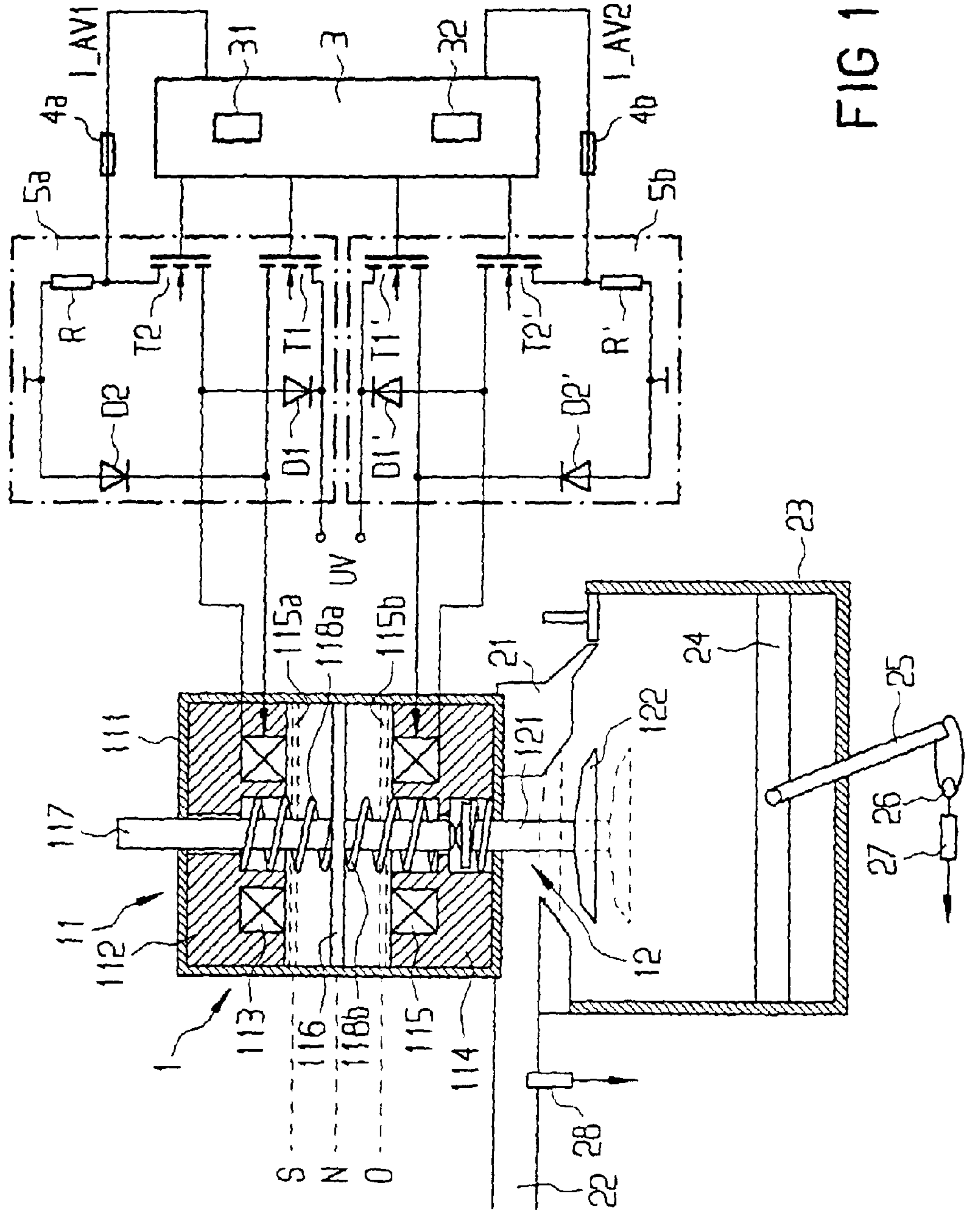
FIG. 1 illustrates an arrangement of an actuator in an internal combustion engine.

An actuating device 1 is illustrated in FIG. 1, comprising an actuator 11 and an actuating element 12, which is formed as a gas exchange valve, having a stem 121 and a disk 122. The actuator 11 has a housing 111 in which a first and a second electromagnet are arranged. The first electromagnet has a first core 112, in which a first coil 113 is embedded in an annular groove. The second electromagnet has a second core 114 in which a second coil 115 is embedded in a further annular groove. An armature having an armature plate 116 is arranged in the housing 111 such that it can move between a first contact surface 115*a* of the first electromagnet and a second contact surface 115*b* of the second electromagnet. The armature further comprises an armature shaft 117 which is guided by cutting out the first and second core 112, 114 and which can be coupled mechanically to the stem 121 of the actuating element 12. A first restoring means 118*a* and a second restoring means 118*b* bias the armature plate 116 into an envisaged rest position N.

The actuating device 1 is rigidly connected to a cylinder head 21. The cylinder head 21 is assigned an intake duct and a cylinder with a piston. The piston 24 is coupled to a crankshaft 26 via a connecting rod 25. A control device 3 is provided, which registers signals from sensors and generates actuating signals, as a function of which the first and second coil 113, 115 of the actuating device I are driven in a power controller 5*a*, 5*b*.

The sensors which are assigned to the control device 3 are formed as a first current sensor 4*a* which registers an actual value I_AV1 of the current through the first coil 113, or as a second current sensor 4*b* which registers an actual value I_AV2 of the current through the second coil 115. In addition to the sensors there may also be further sensors.

Power controller 5*a* has a first transistor T1, having a gate terminal which is connected to an output of the control device 3. The power controller 5*a* has a second transistor T2, having a gate terminal which is electrically conductively connected to a further output of the control device 3. A resistor R is arranged between the source output of the second transistor T2 and the reference potential (supply voltage $U_V$). The resistor R is used as a measuring resistor for the current sensor 4*a*.

The power controller 5*b* is the same as that of the power controller 5*a*. The reference symbols of the electrical components of the power controller 5*b* are designated with a "H-bridge" to distinguish them.

In the following text, the function of the power controller 5*a* is illustrated by way of example. If a high voltage level is present on the gate terminal of the first transistor T1, then the first transistor T1 becomes conductive from the drain to the source (T1=On). If, in addition, the high voltage level is present on the second transistor T2 at the gate terminal, then the second transistor T2 also becomes conductive (T2=On). The supply voltage $U_V$ falls across the first coil 113, reduced by the voltage drop across the resistor R and the transistors T1 and T2. The current through the coil 113 then rises. The first coil is supplied with electrical energy.

If a voltage level is then predefined at the gate terminal of the first transistor T1, then the transistor T1 is turned off (T1=Off) and the diode D2 freewheels. The first coil 113 is therefore operated in the freewheeling operating state. The voltage drop across the first coil 113 is then given by the forward voltage of the second diode D2, of the second transistor T2 and the voltage drop across the resistor R (a total, for example, of two Volts). The current through the first coil 113 then decreases.

If both the voltage level at the gate terminal of the first and also of the second transistor T1, T2 is switched from high to low, then both the first diode D1 and the second diode D2 become conductive, and the current through the first coil 113 is reduced very quickly. This means that turn-off takes place.

Figure 2:
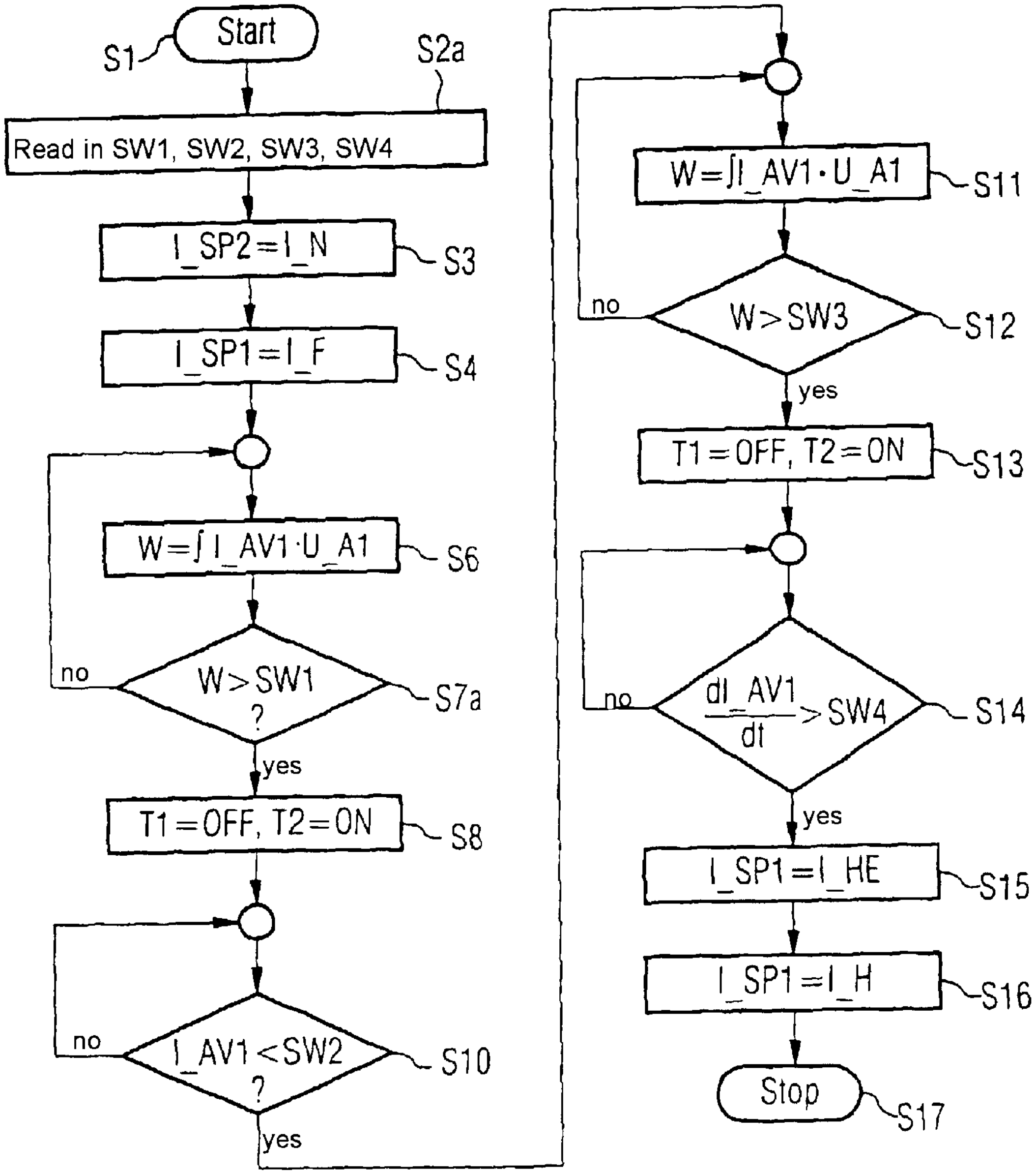
FIG. 2 illustrates a flowchart of a first embodiment of the method for controlling the actuator.

FIG. 2 shows a flowchart of a first embodiment of the method for controlling the actuator 11 which is executed in the control device 3 in the form of a program. In this case, it is unimportant whether the program is implemented in the form of permanently wired logic or is implemented in the form of software and is executed by a microcontroller.

The program is started in step S1, where data is read in from a data memory (not illustrated), and contains information relating to whether the armature plate is resting on the first contact surface 115*a*, i.e., in the closed position S, or whether the armature plate 116 is resting on the second contact surface 115*b*, i.e., in the open position O. In the following text, the program is described where the armature plate 116 is originally in the open position O. In a step S2A various threshold values SW1, SW2, SW3, SW4 are read in either as permanently predefined or as having been corrected in previous passes through the program.

A first threshold value SW1 and a third threshold value SW3 are predefined in such a way that the sum of the first and third threshold values SW1 corresponds to the amount of energy which has to be supplied to the spring/mass oscillator in order to compensate for the energy losses which occur during the movement of the armature plate 116 from the open position O to the closed position S.

In a step S3, a predefined zero value I_N is assigned to a set point I_SP2. The zero value preferably has the value zero amperes. Accordingly, in step S3, the current through the second coil 115 is preferably switched off. A second regulator 32 in the control device 3 regulates the current through the second coil 115 on the basis of the set point I_SP2 and the actual value I_AV2 of the current through the second coil 115. The second regulator 32 generates actuating signals for the gate terminals of the first transistor T1' and the second transistor T2', which are the high or low voltage levels. The second regulator 32 is designed as a two-point regulator but can be designed as any other desired regulator known to those skilled in the art.

In a step S4, a predefined capture value I_F is assigned to a set point I_SP1 of the current through the first coil 113. In the control device 3, a first regulator 31 is provided, which regulates the current through the first coil 113 on the basis of the set point I_SP1 and the actual value I_AV1 of the current through the first coil 113. The first regulator 31 generates actuating signals for the gate-side terminals of the first transistor T1 and the second transistor T2, with the voltage levels "low" or "high." The first regulator 31 is likewise constructed as a two-point regulator; however, it can also be designed as a further regulator known to those skilled in the art.

In a step S6, the electrical energy supplied to the first coil 113 since the start in step S1 is determined. The electrical energy W is assigned the integral over the product of the actual value I_AV1 and the voltage drop U_A1 across the first coil 113. The voltage drop U_A1 across the first coil is determined, for example, from the supply voltage $U_V$ and the voltage drops across the resistor R, the second transistor T2 and the first transistor T1.

In a step S7*a*, a check is made to see whether the electrical energy W supplied to the coil 113 is greater than the first threshold value SW1. If it is not, then processing is continued in step S6 after a predefined waiting time; however, if it is, i.e., a predefined first amount of electrical energy corresponding to the first threshold value SW1 has been supplied to the coil 113, then a branch is made to step S8, wherein the first coil 113 is controlled into the freewheeling operating state (T1=OFF, T2=ON).

In a step S10 a check is made as to whether the current actual value I_AV1 of the current through the first coil is less than the predefined second threshold value SW2. The threshold value is predefined in such a way that it corresponds approximately to half the actual value I_AV1 of the current through the first coil at the transition from step S7*a* to step S8. If this is not so, then processing is continued again in step S10 after a predefined waiting time.

If the condition of step S10 is satisfied, then the current through the first coil is again regulated to the capture value I_F, and in a step S11 the electrical energy W supplied to the first coil 113 since the transition from step S10 to step S11 is determined. In this case, the calculation of the electrical energy W is carried out similarly to the procedure of step S6.

In step S12, a check is made as to whether the electrical energy W supplied to the coil 113 since the transition of the program from step S10 to step S11 is greater than the third threshold value SW3. If this condition is not satisfied, then the processing is continued in step S11 after a predefined waiting time. However, if the condition is satisfied, then in step S13, a first coil 113 is controlled into the freewheeling operating state. Accordingly, no more electrical energy is then supplied to the coil. In step S14, a check is then made to see whether the time derivative of the actual value I_AV1 of the current through the first coil 113 has reached a fourth threshold value SW4. To this end, a check is preferably made as to whether the time derivative is greater than the fourth threshold value SW4. The fourth threshold value SW4 is determined previously in trials and corresponds to the value which the time derivative of the actual value I_AV1 of the current through the first coil has at the time the armature plate 116 strikes the first contact surface 115*a*.

If the condition of step S14 is satisfied, then in step S15 an increased holding value I_HE is assigned to the set point I_SP1 of the current through the first coil 113. The increased holding value I_HE is selected such that after it strikes the first contact surface 115*a*, the armature plate 116 does not become separated from the contact surface 115*a* as a result of bouncing, and does not fall into the rest position N.

After a predefined time period the holding value I_H is then assigned in step S16 to the set point I_SP1 of the current through the first coil 113. In step S17, the program is ended. Executing steps 1 to 17 ensures that the coil is supplied with exactly the electrical energy which compensates for the energy losses which occur as the armature plate 116 moves from the open position O to the closed position S. As a result, it is ensured that the speed at which the armature plate strikes the contact surface 115*a* is extremely low, which results in only slight noise emissions. The cancellation of the electrical energy W supplied in step S6 is carried out with high precision, since the armature plate in this area is not yet located in the near region of the first electromagnet. The first amount of energy, which is reached when the electrical energy W supplied is greater than the first threshold value is preferably considerably greater than the second amount of energy, which is reached when the electrical energy supplied reaches the third threshold value. Thus for example, the first threshold value SW1 is preferably nine times as high as the third threshold value SW3.

During the execution of steps S11 and S12 the first armature plate 116 is already in the near region of the coil 113 so that the determination of the electrical energy supplied can be carried out less precisely than in step S6. However, the substantial advantage in this procedure is that as a result of supplying the electrical energy late in the movement phase and subsequently switching over to the freewheeling operating state in step S13, both the actual value of the current I_AV1 and its time derivative are increased considerably, e.g., by two to three times as compared with supplying the entire amount of energy needed during the execution of steps S6 and S7*a*. Alternatively, in step S14 a check can also be made as to whether the quotient of the derivative of the actual value I_AV1 with respect to time and of the actual value I_AV1 reaches a predefined threshold value.

If in step S1 it is detected that the armature plate 116 is in the closed position S, then a branch (not illustrated) of the program is executed which corresponds to steps S2*a* to S17 but with the difference that in step S3 the set point I_SP1 of the current through the coil is assigned the zero value I_N, in step S4 the set point I_SP2 is assigned the capture value I_F, and in that in step S6 and S11 the integral of the product of the set point I_AV2 of the current through the second coil 115 and of the voltage drop across the second coil 115 is determined. Furthermore, transistors T1' and T2' would be driven, instead of the transistors T1 and T2.

Figure 3:
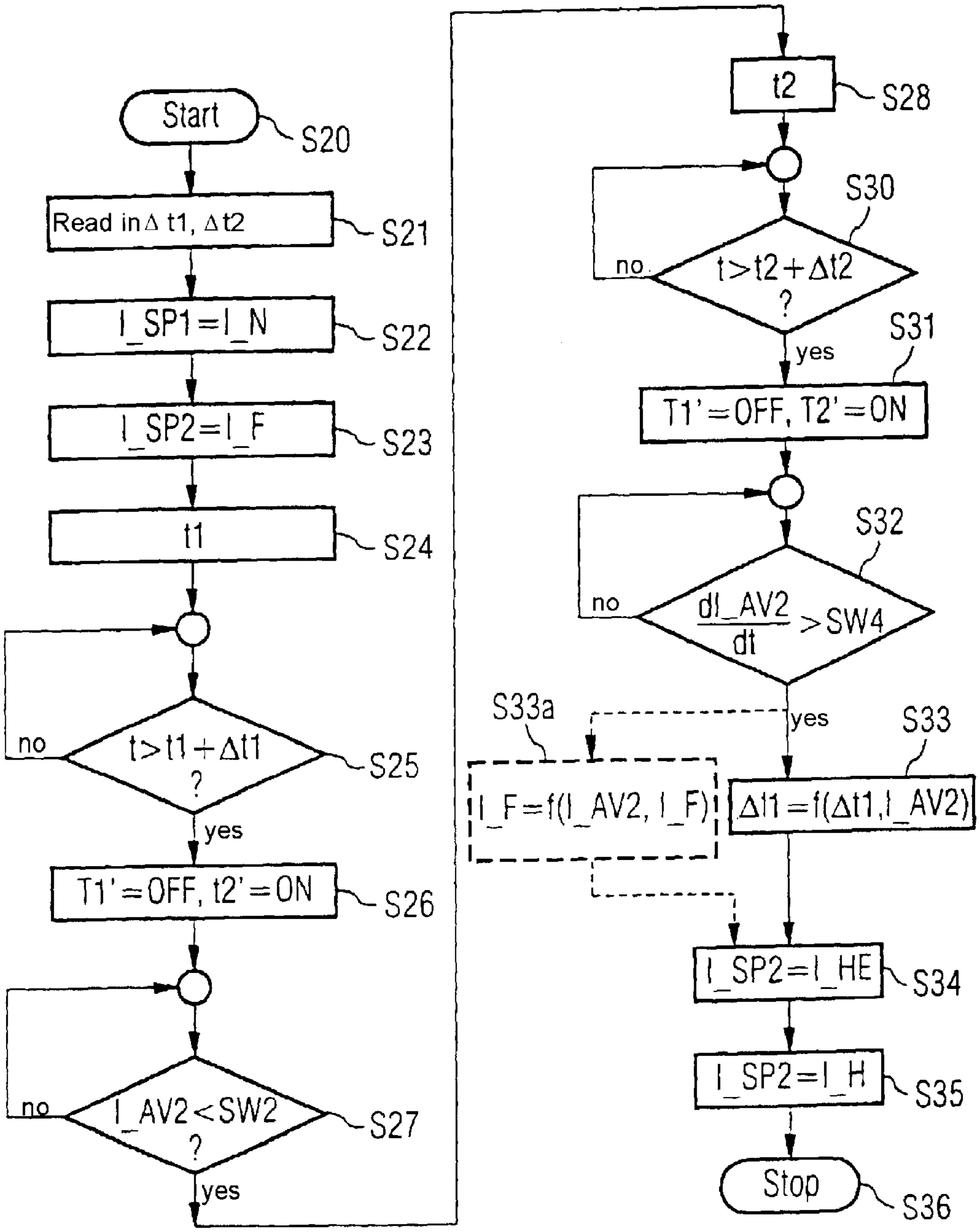
FIG. 3 illustrates a further flowchart of another embodiment of the method for controlling the actuator.

FIG. 3 shows a further flowchart of another embodiment of the method for controlling the actuator 11 which is executed in the form of a program. The program is started in step S20 and data is read from the data memory, which contains information about the current position of the armature plate 116. The steps described below are executed if the armature plate 116 is in the closed position S and the armature plate is to be moved toward the open position.

In step S2, first and second time duration Δt1 and Δt2 are read in from the data memory which are permanently predefined and predetermined in trials, and/or corrected or determined in preceding program passes.

In step S22, the set point I_SP1 of the current through the first coil 113 is assigned the zero value I_N. The first regulator 31 of the control device 3 then regulates the current through the first coil 113 to the zero value I_N. In step S23, in the set point I_SP2 of the current through the second coil, the capture value I_F is assigned. The second regulator 32 of the control unit then regulates the current through the second coil 115 to the capture value I_F.

In step S24 the current time t is assigned to the time t1. In step S25 a check is made as to whether the current time t is greater than the sum of the time t1 and the first time period Δt1. If it is not, then execution is continued in step S25 after a predefined waiting time. However, if the condition of step S25 is satisfied, i.e., the second coil 115 has been energized with the capture value I_F of the current for the first time period Δt1, which corresponds to a first amount of electrical energy, then the second coil 115 is controlled into the freewheeling operating state in step S8. In the freewheeling operating state the coil 115 is no longer supplied with any electrical energy, and the energy stored in the coil is supplied to the spring/mass oscillator.

In step S27 a check is made as to whether the current actuator value I_AV2 of the current through the second coil 115 is less than the second threshold value SW2. If it is not, then execution is continued again in step S27 after a predefined waiting time. However if it is, then the current time t is assigned to the time t2 in a step S28. In addition, a changeover is made from the freewheeling operating state of the second coil 115 to the normal regulation with the set point I_SP2 occupied by the capture value I_F.

In step S30 a check is made as to whether the current time t is greater than the sum of the time t2 and the second time duration Δt2. If it is not, then revision is continued again in step S30 after a predefined waiting time. However, if the condition of step S30 is satisfied, the second time duration Δt2 being predefined in such a way that after the second time duration Δt2 has elapsed, the second coil 115 has been supplied with exactly the second amount of energy, then a branch is made to step S31, in which the second coil 115 is controlled into the freewheeling operating state.

In step S32 a check is made as to whether the time derivative of the set point I_AV2 of the current through the second coil is greater than the predefined fourth threshold value SW4. If it is not, then processing is resumed again in step S32 after a predefined waiting time. And if it is (i.e., the condition of step S32 is satisfied), then in step S33 the predefined first time period Δt1 is corrected on the basis of the current actual value I_AV2 of the current through the second coil 115. In step S33, the actual value I_AV2 differs from an actual value of the current through the coil, as predefined by means of trials, if the speed of the armature does not correspond to the predefined low speed. This is the case if the coil has been supplied either with too little energy or with too much energy. By correcting the first time period Δt1 it is thus possible to ensure the speed at which the armature plate strikes is brought close to a desired striking speed in a following program pass. It is therefore particularly advantageous if the first time period Δt1 is corrected, since supplying electrical energy outside the near region at the closed and open positions can be carried out substantially more precisely.

In step S34 the set point I_SP2 of the current through the second coil 115 is assigned the increased holding value I_H for a predefined time period. In step S35, the set point of the current through the second coil is then assigned the holding valve I_H after the predefined time period of step S34. In step S36, the program is ended. As an alternative or in addition to step S33, a step S33*a* can be provided in which the capture value I_F is corrected on the basis of the actual value I_AV2. The capture value I_F can also assume different values for supplying the first amount of electrical energy during steps S23 to S26 and for supplying the second amount of electrical energy during steps S28 to S30. It is also particularly advantageous if the first amount of electrical energy is supplied to the first or second coil by energizing the coil with the capture value I_F of the current until a predefined magnetic flux in the coil has been reached. This has the advantage that the supply of the first amount of electrical energy is carried out until a predefined position of the armature plate 116 has been reached, since the position of the armature plate is in a fixed, predefined relationship with the magnetic flux through the coil at a predefined current through the coil. In this case, the flux can be determined easily by integrating the voltage drop across the coil over time.

Figure 4:
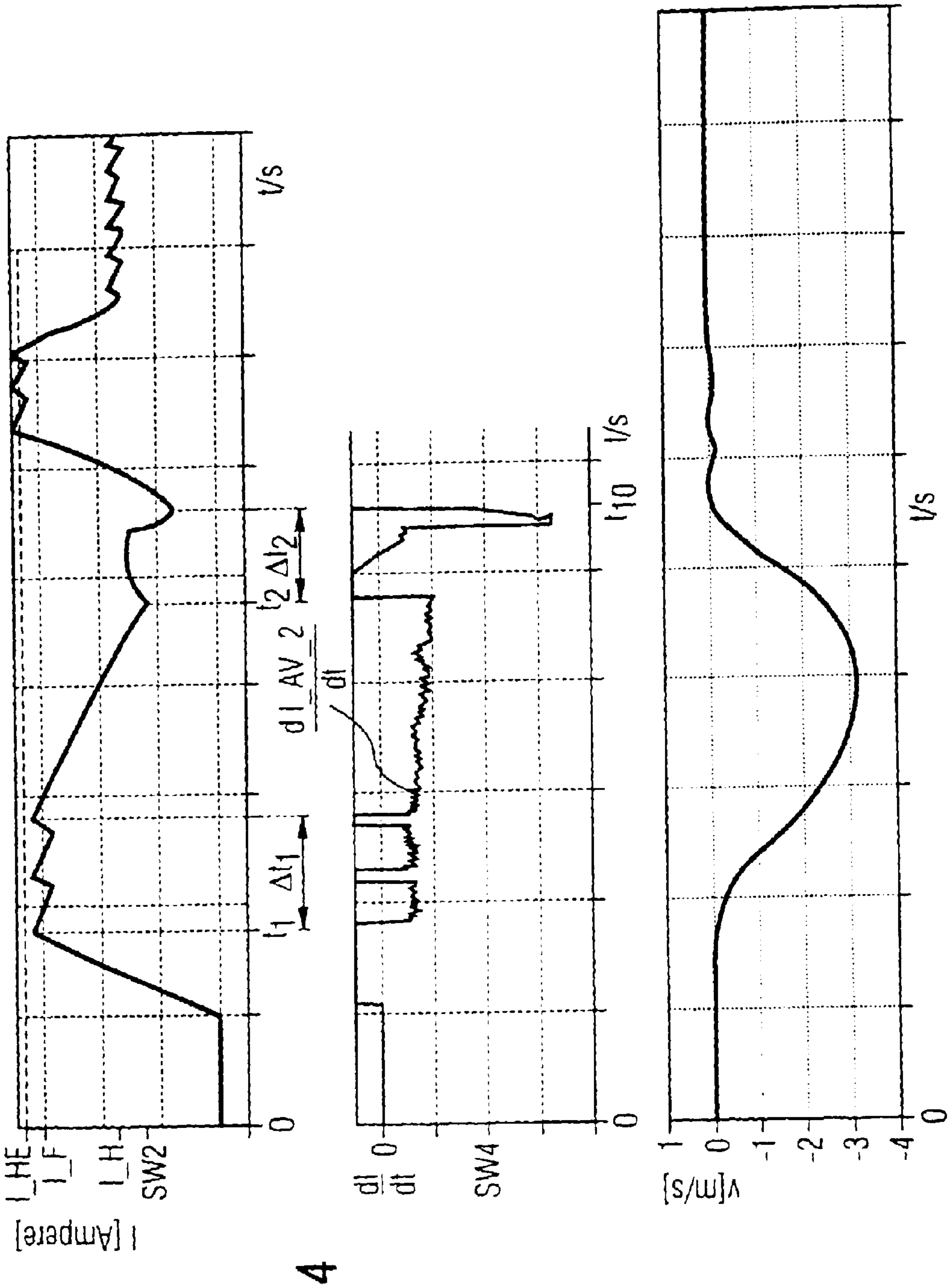
FIG. 4 illustrates signal waveforms of the current through the coil, the time derivative of the current and the speed of the armature plate, plotted against time.

In FIG. 4 the signal waveforms of the current I, the time derivative of the current and the speed of the armature plate 116 are plotted against the time t, to be specific for the embodiment according to FIG. 3. The action of the armature plate 116 striking the second contact surface at the time t10 is detected by using the condition of step S32. In this case, the condition of step S32 counts as satisfied when the derivative of the actual value I_AV2, starting from smaller values, exceeds the fourth threshold value. It can clearly be seen from the current waveform that by supplying electrical energy during the second time period Δt2 and subsequently changing over into the freewheeling operating state, the magnitude of the derivative of the actual value I_RV2 of the current through the second coil assumes a significantly higher value than when freewheeling before the time t2. This has the advantage that measurement errors resulting from interference on the measuring signal have an only insignificant effect. Such interference is caused, for example, by noise on the measured signal and/or electromagnetic fields.

The present invention is not to be understood as being restricted to the exemplary embodiments described hereinabove, and includes, but is not limited to a combination of the exemplary embodiments according to FIGS. 2 and 3.

We claim:

1. A method for controlling an actuator having at least one electromagnet which has a coil, an armature having an armature plate which can move between a contact surface on the electromagnet and a further contact surface, and at least one restoring means which is mechanically coupled to the armature, comprising the following steps when the armature plate is to be moved from contact with the further contact surface into contact with the contact surface on the electromagnet: supplying a predefined first amount of electrical energy to the coil; controlling the coil into a freewheeling operating state until a first predefined condition is satisfied, whereby the armature plate is near a region of the contact surface; supplying a predefined second amount of electrical energy to the coil before the armature plate is resting on the contact surface of the electromagnet; controlling the coil into a freewheeling operating state until a second condition is satisfied, whereby the armature plate is resting on the contact surface of the electromagnet; and supplying the coil with electrical power which is predefined so that the armature plate remains in contact with the contact surface.

2. The method according to claim 1, wherein the predefined first amount of electrical energy is supplied to the coil by energizing the coil with a predefined first capture value for a predefined time period.

3. The method according to claim 1, wherein the first predefined condition is satisfied when the current through the coil falls below a predefined threshold value.

4. The method according to claim 1, wherein the predefined second amount of electrical energy is supplied to the coil by energizing the coil with a further predefined capture value for a predefined second time period.

5. The method according to claim 1, wherein the second condition is satisfied when the time derivative of the current through the coil reaches a predefined threshold value.

6. The method according to claim 1, wherein the first amount of electrical energy to be supplied is corrected on the basis of a variable that characterizes the speed of the armature plate when it strikes the contact surface.

7. The method according to claim 2, wherein the predefined time period is corrected on the basis of a variable that characterizes the speed of the armature plate when it strikes the contact surface.

8. The method according to claims 2 and 4, wherein predefined capture values are corrected on the basis of a variable that characterizes the speed of the armature plate when it strikes the contact surface.

9. The method according to claims 6 and 8, wherein the variable that characterizes the speed of the armature plate when it strikes the contact surface is the value of the current at the time at which the second condition is satisfied.

* * * * *